Nov. 9, 1971 G. IRWIN 3,618,496
AUTOMATIC FLASHCUBE ADVANCING MECHANISM
Filed Oct. 7, 1969 2 Sheets-Sheet 1
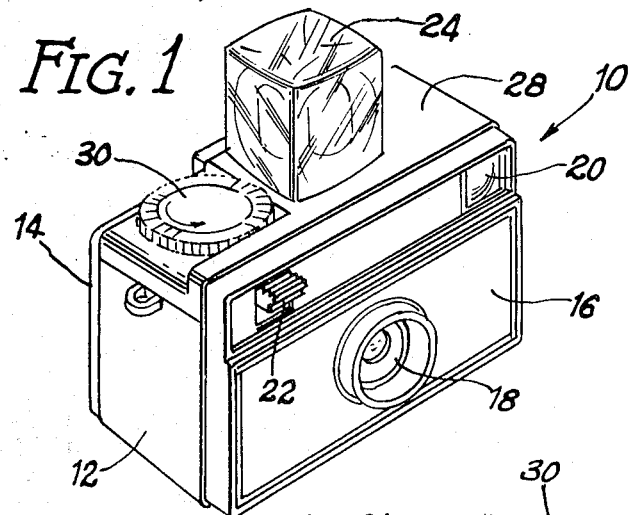
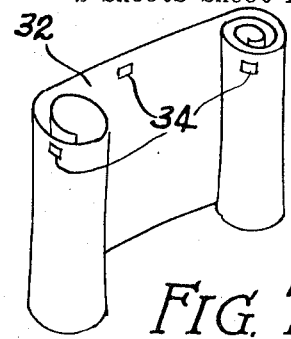
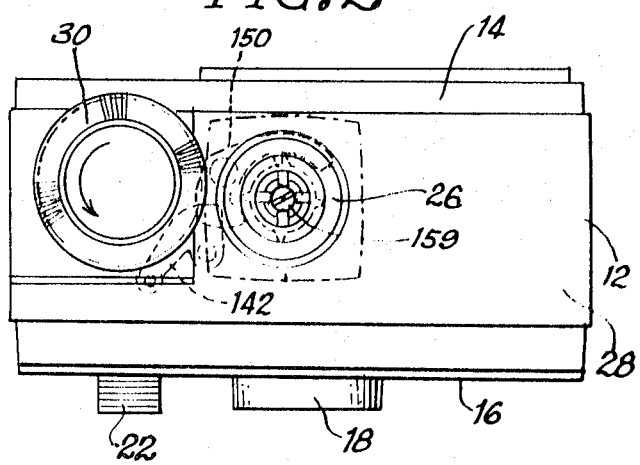
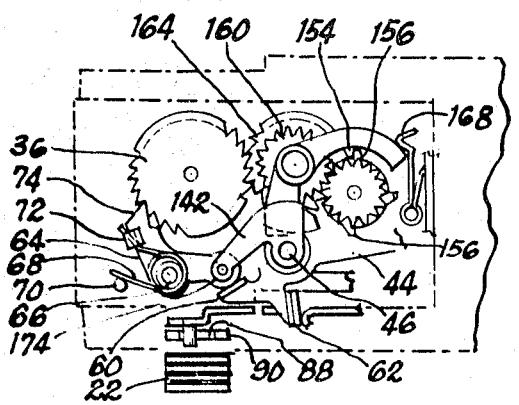
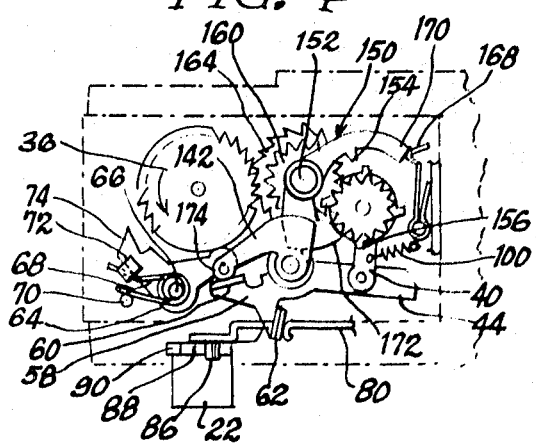
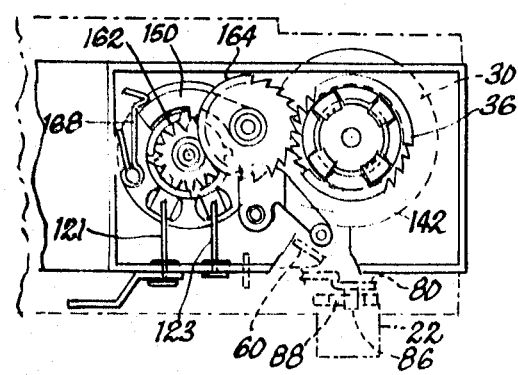
INVENTOR
George Irwin
by McDougall, Hersh, Scott and Todd
Attys

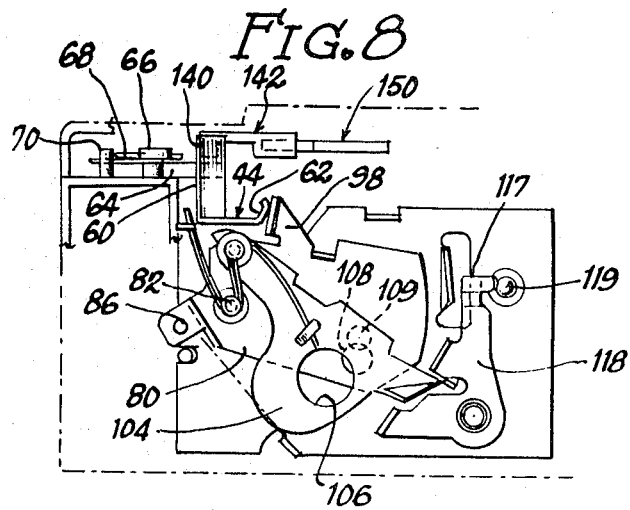
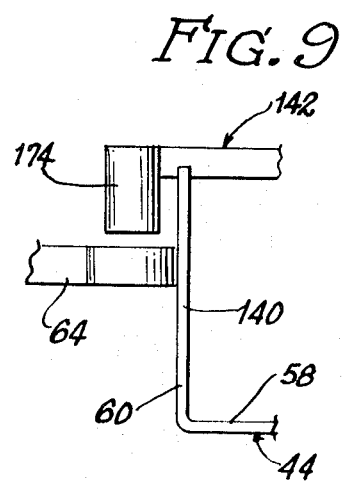
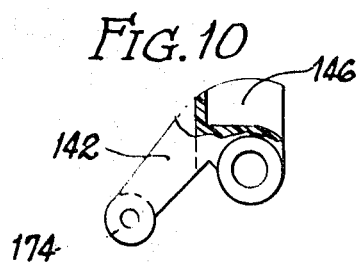
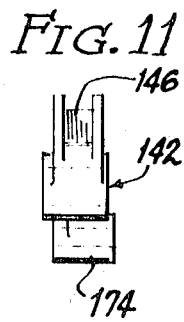
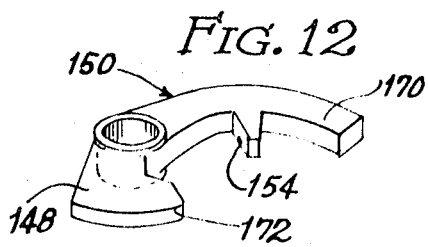
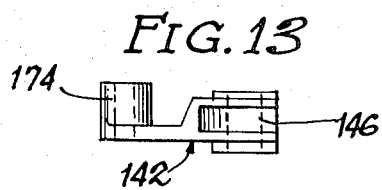
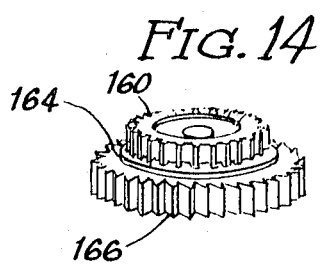
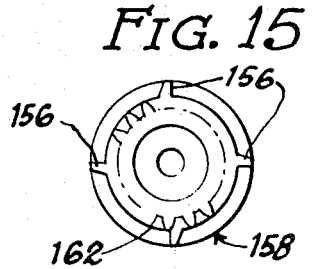
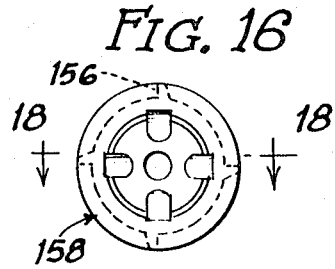
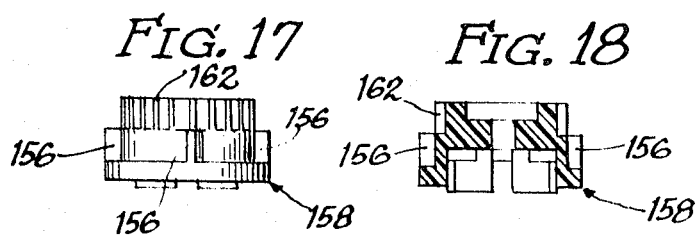
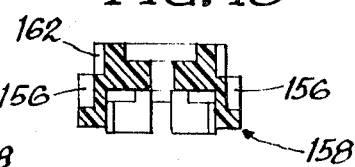

United States Patent Office 3,618,496
Patented Nov. 9, 1971

3,618,496
AUTOMATIC FLASHCUBE ADVANCING MECHANISM
George Irwin, 1747 Elmwood Drive,
Highland Park, Ill. 60037
Continuation-in-part of application Ser. No. 816,951,
Apr. 17, 1969. This application Oct. 7, 1969, Ser.
No. 864,375
Int. Cl. G03b 1/14, 1/62, 15/04
U.S. Cl. 95—31 FM                                7 Claims

ABSTRACT OF THE DISCLOSURE

A camera construction including a housing holding a length of film having spaced apart perforations used for locating successive frames in the film. The film advancing mechanism is associated with a flash lamp socket which holds a lamp having a plurality of flash bulbs whereby a fresh bulb can be moved to picture taking position simultaneously with the movement of a succeeding film frame to the picture taking position. The drive means for the lamp comprise a drive gear and associated clutch. Detents are formed on a member which is associated with the drive gear, and a finger engages the detents to stop rotation of the bulb socket before completion of the film advancing movement whereby a bulb will be precisely positioned irrespective of the degree of film movement necessary for properly locating a succeeding film frame.

---

This application is a continuation-in-part of applicant's application Ser. No. 816,951, filed Apr. 17, 1969.

This invention is directed to a camera construction designed for use in combination with a flash lamp utilizing a plurality of separate flash bulbs. A typical flash lamp of this type is referred to as a flashcube which comprises a common mounting for four separate flash bulbs. The bulbs are adapted to be energized in sequence whereby the operator of a camera can take a plurality of pictures before changing the flash structure.

The invention will be described with reference to camera constructions employing film having a plurality of perforations located in accordance with the position of picture taking frames on the film. Such film may be located in a cartridge or magazine. Nerwin Pat. No. 3,138,081, issued on June 23, 1964, illustrates a construction comprising a roll film magazine wherein a length of film is located within a magazine body. One end of the film is attached to a spool at one side of the magazine while a supply roll of film is located at the other side of the magazine. An opening is defined by the back of the magazine whereby movement of the film will provide for exposure through this opening. When the film is associated with a camera adapted to rotate the spool, the pictures can be taken.

A camera adapted to be used in conjunction with the magazine is disclosed in Harvey Pat. No. 3,138,084. This camera is provided with a sensing finger which is adapted to engage the surface of the film in the cartridge. The perforations defined by the film are spaced at intervals which correspond to a frame of the film. The sensing finger is adapted to successively engage these perforations as the film is moved in the camera. Engagement of a perforation by the sensing means will impede further movement of the film whereby the user of the camera can automatically determine when the film is in a position for taking the next picture. In the Harvey construction, a separate button is provided on the camera for disengaging the sensing finger to permit further movement of the film.

In applicant's copending application Ser. No. 816,951, filed Apr. 17, 1969, and entitled "Cartridge Type Camera Construction," there is described a camera which is highly desirable for use in conjunction with such film magazines. This construction provides operating mechanisms which are greatly simplified when compared with prior art designs. The construction can, thus, be manufactured at a relatively low cost, and is more reliable for the user.

The introduction of flashcube constructions provides added advantages for individuals taking pictures. In prior arrangements using flash bulbs, it was necessary to insert a separate bulb after each picture was taken. With such an arrangement, a relatively extended time delay takes place between successive picture taking operations. The flashcube arrangement permits successive pictures by merely shifting the position of the cube after a picture is taken.

Previous camera constructions, for example, applicant's Pat. No. 3,464,335, issued Sept. 2, 1969, and entitled "Camera With Flashcube Mechanism," have included means for incorporating a flashcube into a camera which utilizes film cartridges. In the patented structure, the film advance mechanisms are tied to the flashcube socket so that the flashcube will rotate automatically during film advance. This requires a relatively complex arrangement since the degree of rotation of the film winding wheel is not a constant. Therefore, changing the position of the flashcube which requires 90° of rotation cannot be directly related to the film advance, for example by selecting appropirate gear ratios. Mechanisms must be employed which will stop the flashcube after 90° of rotation while allowing for additional rotation of the film advancing mechanisms.

It is a general object of this invention to provide a camera construction which is particularly suitable for simultaneous use of film cartridges and flashcubes.

It is a more specific object of this invention to provide a camera construction which is characterized by an automatic flashcube advancing mechanism whereby the operator of the camera can advance film from one frame position to the next while simultaneously moving a fresh flash lamp into picture taking position.

It is a still further object of this invention to provide automatic advancing means for flashcube constructions which are particularly applicable to camera constructions of the type described in applicant's copending application Ser. No. 816,951.

These and other objects of this invention will appear hereinafter and for purposes of illustration, but not of limitation, specific embodiments of the invention are shown in the accompanying drawings in which:

FIG. 1 is a perspective view of a camera construction of the type contemplated by this invention;

FIG. 2 is a plan view of the camera construction;

FIG. 3 is a fragmentary plan view of the drive mechanisms incorporated in the camera construction;

FIG. 4 is a fragmentary plan view of the drive mechanisms as they appear during film advance;

FIG. 5 is a fragmentary view of the drive mechanisms as viewed from below;

FIG. 6 is a detailed view of an assembly of parts included in the drive mechanism;

FIG. 7 is a perspective view illustrating film of the type preferably utilized in conjunction with cameras of the type described;

FIG. 8 is a rear elevational view of parts employed during shutter operation;

FIG. 9 is an enlarged detail view of the elements employed for transferring shutter movements to unlocking elements permitting film advance; and, FIGS. 10 through 18 comprise detailed views of individual elements utilized in the construction.

This invention generally relates to a camera construction of the type including a housing for holding a length of film. The camera construction operates in particular with film of the type defining spaced-apart perforations used for rotating successive film frames in picture taking position.

The construction includes a film winding wheel and a rotatable lamp socket designed to receive a flashcube or other lamp of the type including a plurality of flash bulbs. The mechanisms of the invention particularly include drive gear means operatively connected to the lamp socket and clutch means interposed between the drive gear means and film advancing means. Detents are formed on the drive gear means with the number of detents corresponding to the number of bulbs in the lamp. An arm is provided for engaging the detents during operation of the film advancing means to stop the drive gear means and associated lamp socket prior to completion of the film advance. The clutch means permits continued movement of the film advancing means to permit proper positioning of the film.

The mechanisms described are associated with operating elements comprising a pivotally mounted camming element directly attached to a sensing finger used for detecting perforations in the film. An explained in application Ser. No. 816,951, pivoting movement of this element controls a dog associated with a film winding ratchet wheel also controlling a locking element which locks and unlocks the shutter lever plate. In accordance with this invention, the camming element also controls the position of the detent engaging arm to thereby control the degree of rotation of the lamp of the lamp socket. Accordingly, the features of this invention can be incorporated in a structure of the type described in the copending application whereby the simplicity and reliability of the operating elements in the camera construction of the copending application can be retained.

The accompanying drawings illustrate a camera construction 10 comprising a housing 12 and a back wall 14. The back wall is movable to provide access to the interior of the housing for loading the camera with film.

The front wall 16 of the housing defines a centrally located lens opening 18. A viewing window 20 is provided at one corner of the construction, and a shutter actuating button 22 extends outwardly from the front wall on the other side of the construction.

A flashcube 24 is adapted to be located in a rotatable socket 26 positioned on the top wall 28. The cube-type lamp illustrated is provided with four individual bulbs adapted to be successively fired when moved to the firing position. Other types of multiple bulb structures associated with a movable socket could readily be used while following the concepts of this invention.

A film advancing wheel 30 is also located on the top wall 28. Film 32 of the type employed in the construction is shown in FIG. 7. The film defines perforations 34 which are located at intervals corresponding with the frame portions of the film. Usually, film of this type is mounted in a cartridge as explained in the aforementioned patents.

The film advancing wheel 30 is tied to a ratchet 36 located immediately beneath the top wall 28. The ratchet in turn defines means for engaging the spool provided for the film in a conventional manner. In the operation of the construction, the film is inserted in the camera and the back wall is replaced. The film advancing wheel 30 is then operated until the first frame of the film is in position for taking a picture.

The operating elements within the camera include a finger 38 which is integral with the arm 40. The finger normally engages the emulsion side of the film 32 in line with the perforations 34. When the finger is in engagement with the film, then the advancing wheel 36 is free to rotate.

The arm 40 carrying the finger 38 is pivotally connected at 42 to a camming element 44. This element is pivotally attached at 46 to the camera housing. The arm 58 of the camming element 44 defines a pair of bearing members 60 and 62. The member 60 presses into engagement with the dog 64 which is pivotally attached to the housing at 66. The spring 68 has one end bearing against the post 70, and the other end bearing against the element 72 formed integrally with the dog. Accordingly, the pawl end 74 of the dog is normally urged toward the teeth of the ratchet 36. Reference is made to the aforementioned copending application for a more detailed showing and explanation of these elements as well as of the shutter actuating means employed in the camera.

Shutter actuation is accomplished by means of the button 22 which includes a vertically extending portion 90 defining slot 88. A pin 86 carried by the pivotally mounted shutter lever plate 80 is received in the slot 88. As explained in the aforementioned application, vertical downward movement of the actuating button results in pivoting movement of the plate 80 about the pivot point 82 whereby the drive element 98 of the plate 80 presses against the bearing member 62 of the camming element 44. In addition to the operating movements which are accomplished by this action, the downward movement of the shutter button results in momentary alignment of the shutter openings 106, 108 and 109 for picture taking purposes. The bulb in position will flash when the end 117 of plate 118 engages contact 119 in response to movement imparted by the plate 104. Leads 121 and 123 extend from the bulb socket in a conventional fashion.

Movement of the plate 80 against the bearing element 62 results in pivoting of the camming element 44 whereby the arm 58 of the camming element will pivot the dog 64 to release the ratchet 36 for rotational movement. At the same time, pivoting movement of the element 44 pulls the arm 40 away from the back of the film 32 to withdraw the finger 38 from a perforation 34.

A spring 100 attached to the arm 40 pulls the arm in a clockwise direction whereby the shoulder 92 defined by the arm will engage a wall 94 of the housing as explained in the aforementioned copending application. In actual practice, the arm 40 is pulled back a greater distance than is required for the shoulder 92 to clear the wall 94. Engagement of the shoulder with the wall then prevents complete return pivoting movement of the element 44 thereby holding the dog 64 out of engagement with the ratchet.

The action described corresponds with the action accomplished with the structure of the aforementioned application. Additional action for achieving movement of the flashcube is accomplished by providing a vertically extending portion 140 on the camming element 44 (FIG. 8). This extension is formed integrally with the bearing members 60 on the arm 58 of the camming element, and the extension is positioned for engagement with one end of lever arm 142 which is connected for pivotal movement in axial alignment with the camming element 44. The arm 142 includes a pocket 146 which receives the end 148 of latching element 150. The latching element is pivotally connected at 152, and the element includes a latching finger 154. The finger 154 is positioned for engagement with lobes 156 which are formed on the socket drive element 158 (FIGS. 15–18). This socket drive element is directly attached to the bulb socket 26 by means of a pin 159 whereby rotation of the drive element will result in rotation of a flashcube located in the socket 26.

Rotation of the drive element 158 is accomplished through engagement of gear 160 with the gear teeth 162 defined by the socket drive element. The gear 160 is connected through slip clutch 164 to gear 166. The gear 166 meshes with the teeth defined by the ratchet 36.

In the operation of the construction, after release of the finger 38 from a film perforation, the ratchet 36 will rotate upon rotation of the film advance knob. This will result in rotation of the gear 164 and the gear 160 as long as the finger 154 is maintained out of engagement with a lobe 156.

Release of the finger 154 on the latching arm is accomplished when the arm pivots in response to the action of the extension 140 on the camming element 44. This action pivots the lever arm 142 and, since the end 148 of the latching element 150 is received in the pocket 146 defined by the arm 142, the latching arm 150 will pivot when its end 148 is engaged by the end wall of the pocket. This will raise the finger 154 out of blocking engagement with the lobes 150.

A spring 168 is positioned for engaging the end 170 of the latching arm to hold the latching arm in the position shown in FIG. 4. This is required since the force applied by the arm 142 is removed when the shutter is released. Thus, the camming element 44 undergoes a certain amount of return pivotal movement in order to move the shoulder 92 of the arm 40 into pressing engagement with the camera housing. The amount of this return movement is sufficient to release the latching arm 150 from the action of the arm 142. The pocket 146 is employed to confine the end 148 thereby permitting relative movement without the danger of losing alignment between these elements.

When the film advance knob is rotated, the socket drive element 158 will rotate therewith. This will bring one of the lobes 156 into engagement with the edge 172 defined by the latching arm 150. This will cause the latching arm to pivot in opposition to the spring 168 whereby the arm will again be in blocking position with respect to the next lobe. Referring to FIG. 4, the lobe at the top of the figure represents the lobe which was previously engaged by the finger 154. The lobe at the bottom will operate to reposition the latching arm 150 whereby the lobe in-between will be engaged by the finger 154. With this arrangement, movement of the socket drive element is limited to 90°. Continued rotation of the ratchet 36 is permitted due to the action of the slip clutch.

The described action for releasing and rotating the bulb socket is best accomplished by imparting driving action to the lever arm 142 only during the last portion of the downward stroke of the shutter actuating elements. As shown in FIGS. 3 and 9, the end 174 of the lever 142 will be engaged by the cam arm 58 subsequent to engagement of the arm with the ratchet dog 64. When the shutter button 22 is released, the camming element 44 reverses to some degree, there will, therefore, be sufficient release of the lever arm 142 to permit repositioning of the latching element 150 even though the ratchet dog 64 is still held out of engagement with the ratchet 36.

As explained in the aforementioned application, film movement will continue until the finger 38 engages the next perforation in the film 32. This engagement will result in release of the shoulder 92 adjacent the finger whereby the camming element 44 will complete its return pivotal movement so that the dog 64 will lock the ratchet 36 against further rotation.

It will be understood that various changes and modifications may be made in the above described construction which provide the characteristics of this invention.

That which is claimed is:

1. In a camera construction including a housing for holding a length of film, said film defining spaced-apart perforations used for locating the successive frames in the film, the camera including sensing means adapted to detect said perforations, means for advancing the film, and a flash lamp socket associated with said housing, said socket being designed for holding a lamp of the type comprising a plurality of flash bulbs, and means for energizing a bulb when the bulb is moved to picture taking position and in response to operation of the camera shutter, the improvement in means for moving said lamp comprising drive gear means operatively connected to said socket, clutch means associated with said drive gear means, said clutch means being interposed between said film advancing means and said drive gear means, a plurality of equally spaced detents formed on said drive gear means for rotation therewith, the number of said detents corresponding to the number of bulbs in said lamp, a pivotally mounted member defining a first surface portion adapted to be interposed in the path of movement of said detents for engaging said detents, the engagement of said first surface portion with a detent serving to stop said drive gear means after rotational movement sufficient to move from one bulb position to the next, said clutch means permitting continued movement of said film advancing means after stopping of said drive gear means, and wherein said pivotally mounted member defines a second surface portion adapted to be interposed in the path of movement of said detents for engagement by said detents, the engagement of said second surface portion by one of said detents during said rotational movement operating to pivot said pivotally mounted member to interpose said first surface portion in position for engagement by another of said detents to thereby stop said drive gear means until the next shutter actuation.

2. A construction in accordance with claim 1 wherein said detents comprise lobes extending outwardly from said drive gear means, said member comprising a latching arm and wherein first surface portion comprises a finger for engaging said lobes.

3. A construction in accordance with claim 1 wherein said drive gear means comprises a rotatable element locked in engagement with said lamp socket, gear teeth defined by said rotatable element, a pair of gears having one gear engaging said gear teeth, said clutch means comprising a clutch interposed between said pair of gears, and a gear secured to said film advancing means engaging the other gear of said pair of gears.

4. A construction in accordance with claim 1 wherein said pivotally mounted member comprises a latching arm, a lever arm interposed between said latching arm and said camming means, said camming element engaging said lever arm with the lever arm then moving said latching arm to the disengaging position, and including separate means engaging said latching arm for temporarily holding the latching arm in the disengaging position.

5. A construction in accordance with claim 4 wherein said lever arm defines a pocket which receives one end of said latching arm.

6. A construction in accordance with claim 1 including a camming element for pivoting said pivotally mounted member in response to shutter actuation to disengage said first surface portion from a detent to thereby permit the repetition of said rotational movement after each shutter actuation.

7. A construction in accordance with claim 4 wherein said means for temporarily holding the latching arm comprises a spring pressing into engagement with the end of said latching arm, and wherein the engagement of a detent with said second surface portion operates to pivot said latching arm in opposition to said spring.

References Cited

UNITED STATES PATENTS

| | | | |
|---|---|---|---|
| 3,464,335 | 9/1969 | Irwin | 95—11 |
| 3,512,465 | 5/1970 | Winkler et al. | 95—31 ACFS |
| 3,487,758 | 1/1970 | Rigolini et al. | 95—31 ACFS |
| 3,416,424 | 12/1968 | Harvey | 95—11 X |

SAMUEL S. MATTHEWS, Primary Examiner

R. E. ADAMS, Assistant Examiner

U.S. Cl. X.R.

95—11 L, 31 FL